Aug. 24, 1948.　　　　G. A. DUNN　　　　2,447,640
METHOD AND APPARATUS FOR ORIENTING,
PEELING, HALVING, AND CORING PEARS
Filed Oct. 5, 1942　　　　　　　　　　14 Sheets-Sheet 2

Inventor
Guy A. Dunn
By
Lyon & Lyon
Attorneys

Aug. 24, 1948.                 G. A. DUNN                          2,447,640
              METHOD AND APPARATUS FOR ORIENTING,
              PEELING, HALVING, AND CORING PEARS
Filed Oct. 5, 1942                                        14 Sheets-Sheet 4

Inventor
Guy A. Dunn
By Lyon & Lyon
attys

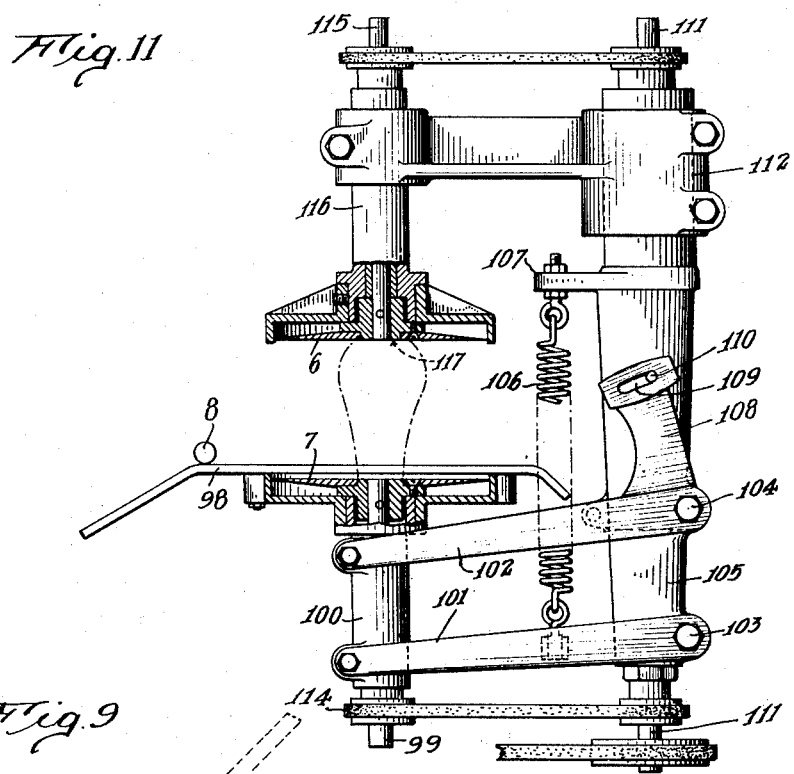
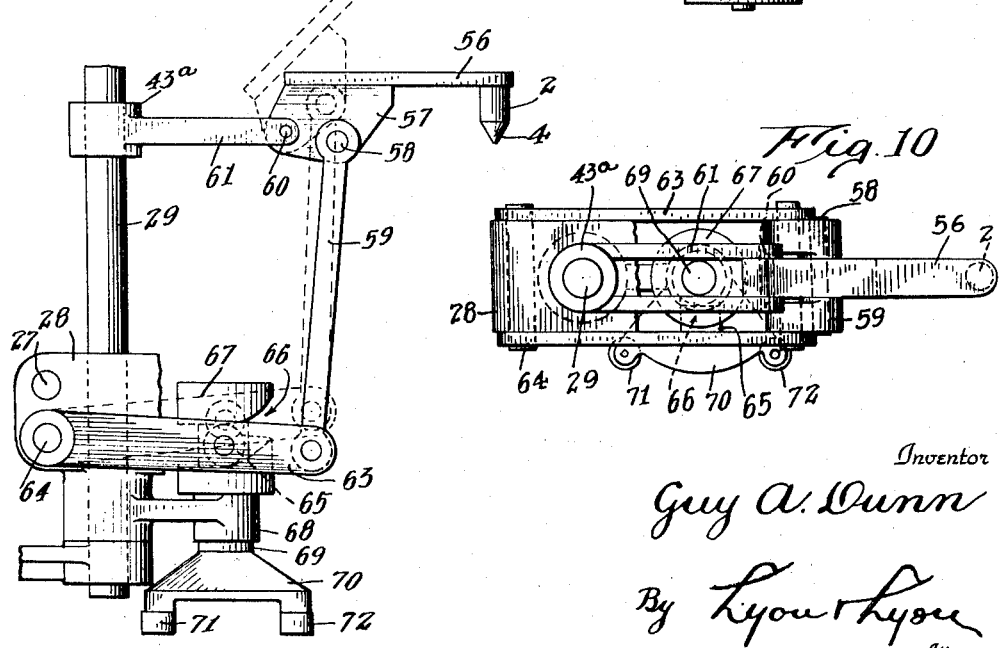

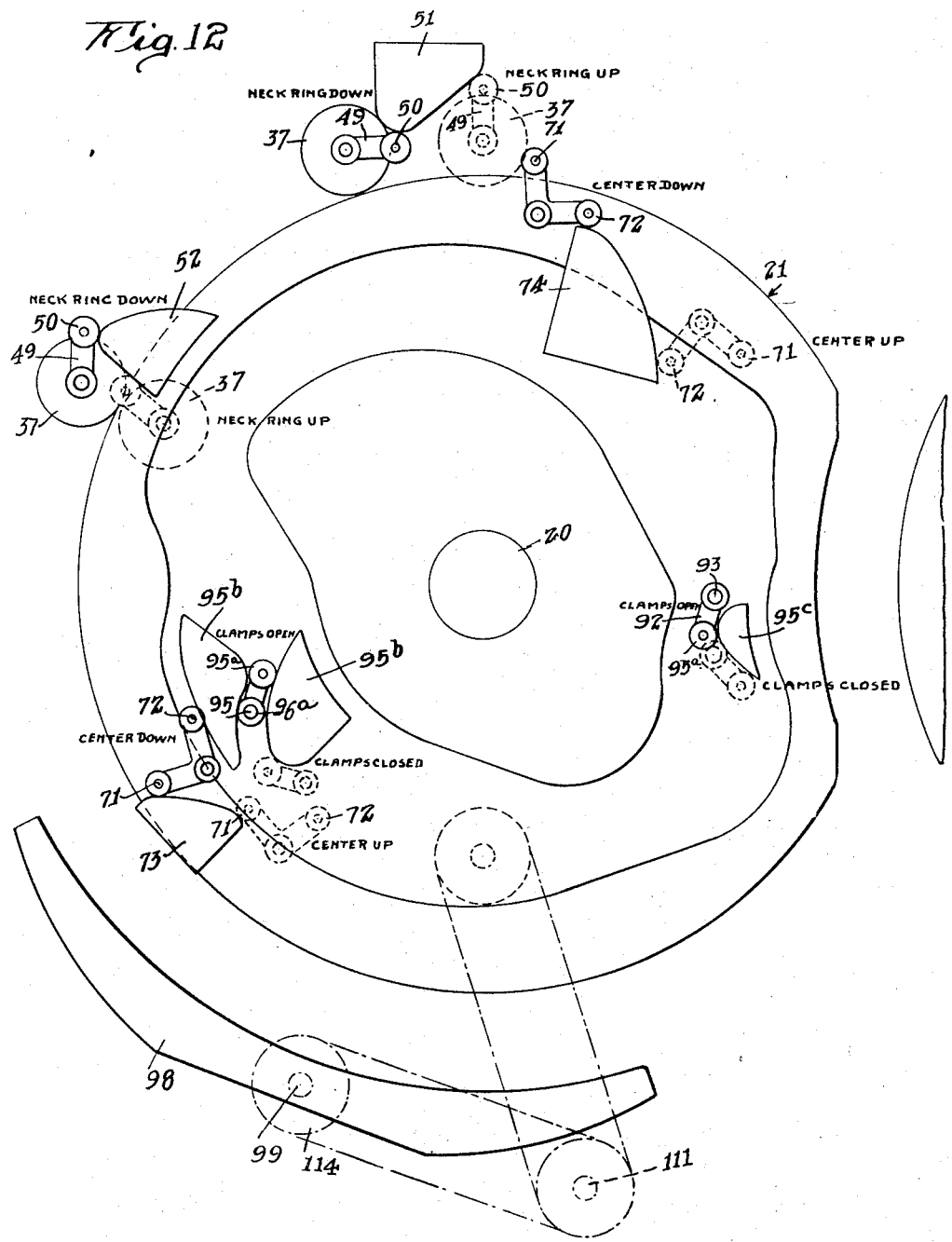

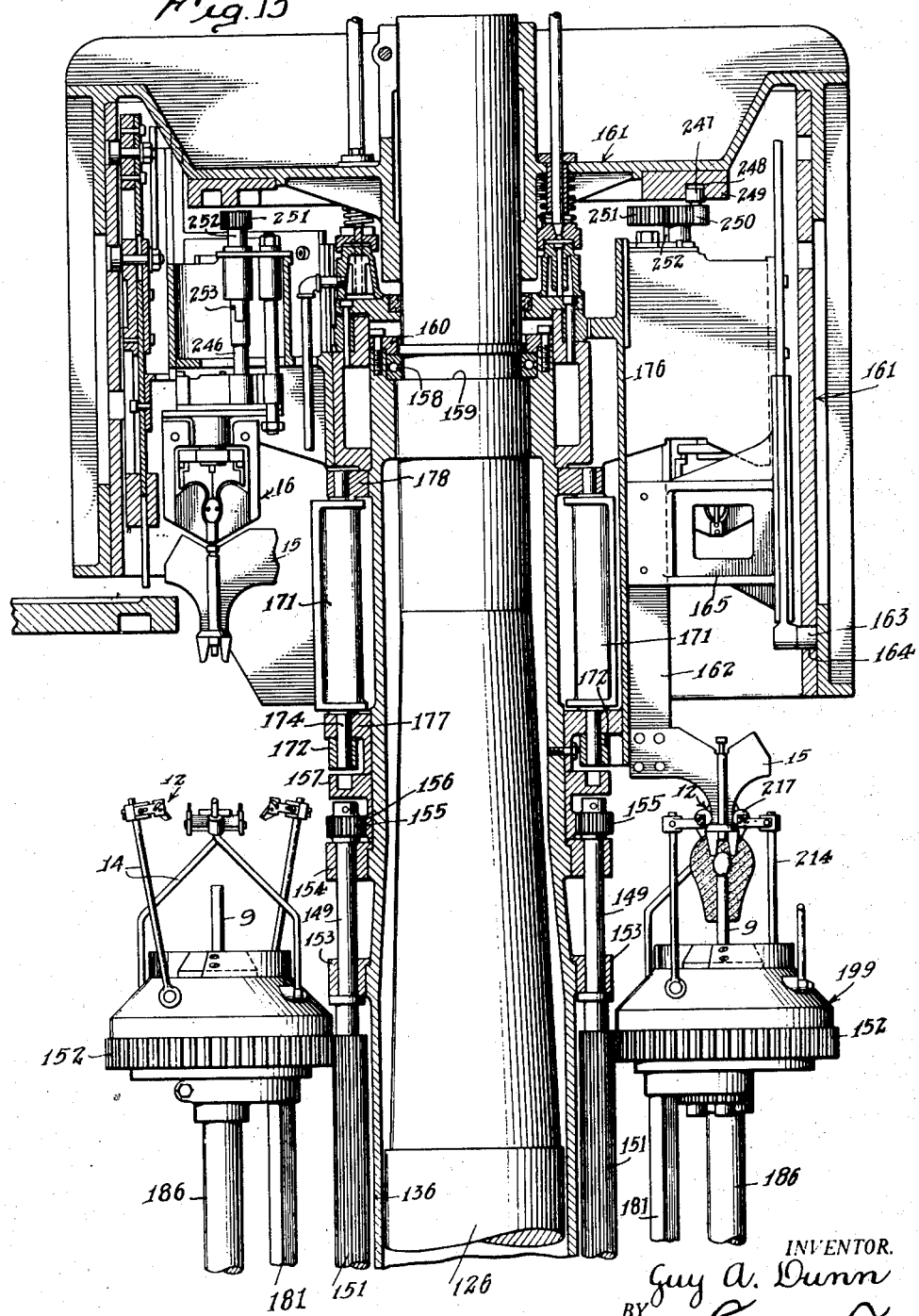

Aug. 24, 1948.                G. A. DUNN                    2,447,640
               METHOD AND APPARATUS FOR ORIENTING,
                PEELING, HALVING, AND CORING PEARS
Filed Oct. 5, 1942                              14 Sheets-Sheet 11

INVENTOR.
Guy A. Dunn
BY
Lyon + Lyon
ATTYS.

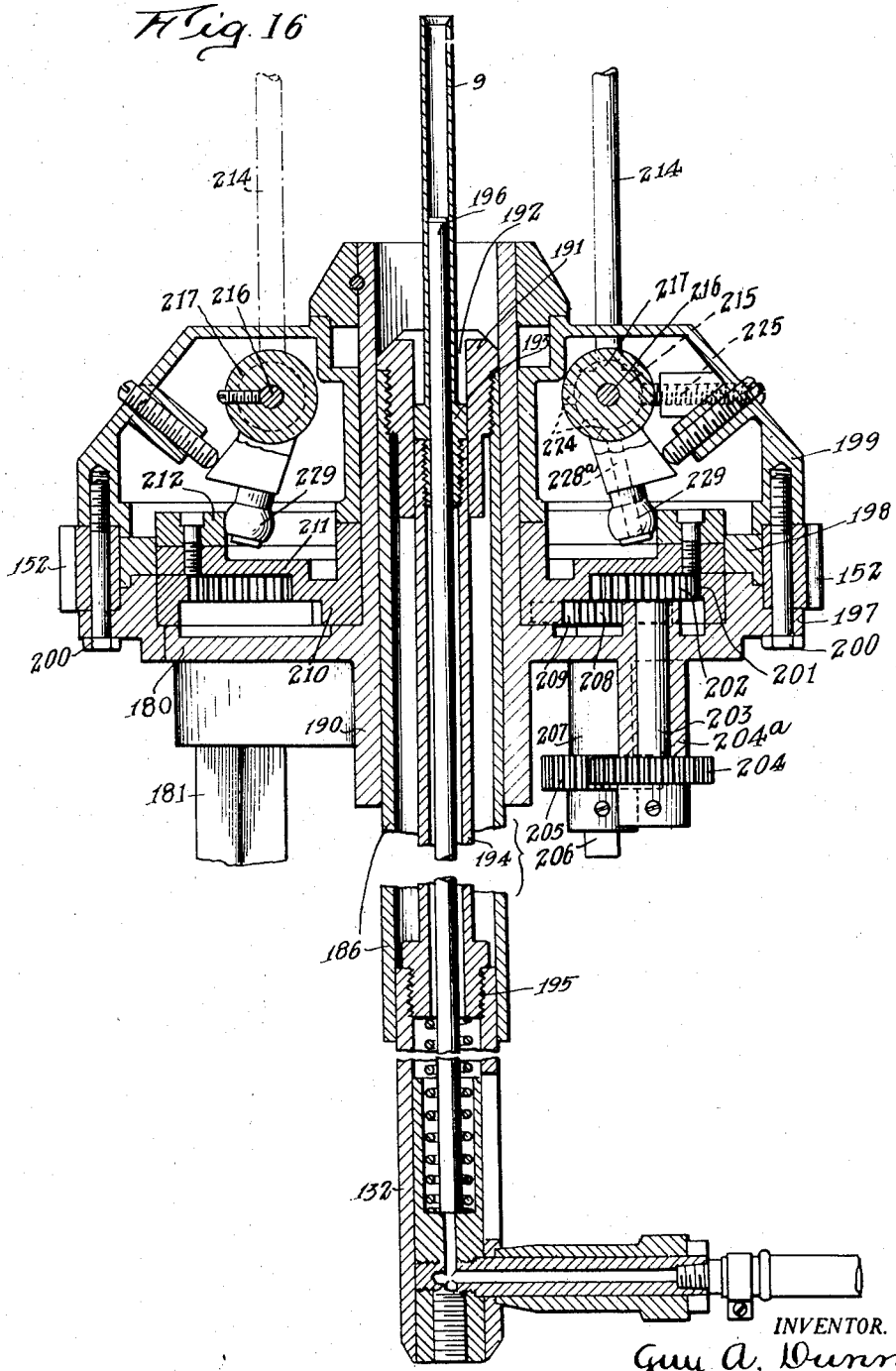

Aug. 24, 1948.  G. A. DUNN  2,447,640
METHOD AND APPARATUS FOR ORIENTING,
PEELING, HALVING, AND CORING PEARS
Filed Oct. 5, 1942  14 Sheets-Sheet 13
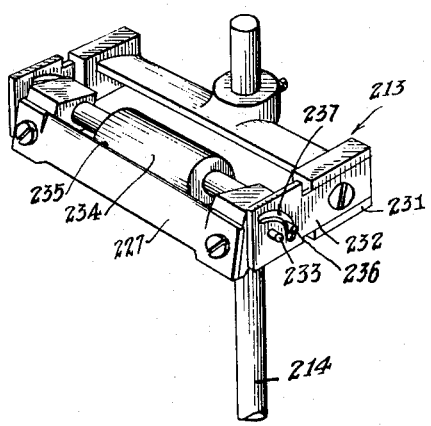
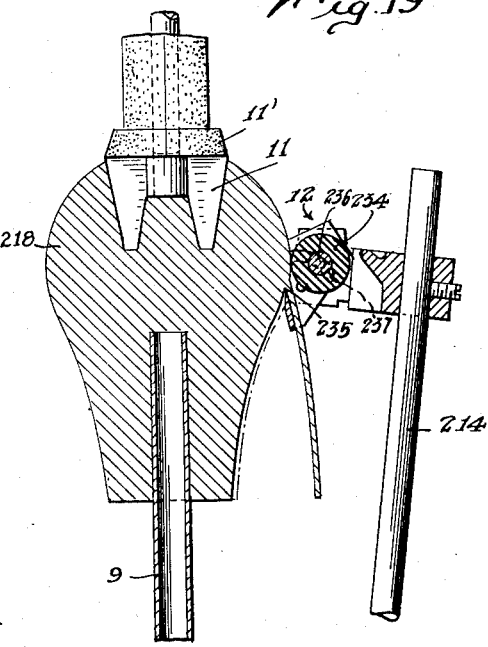
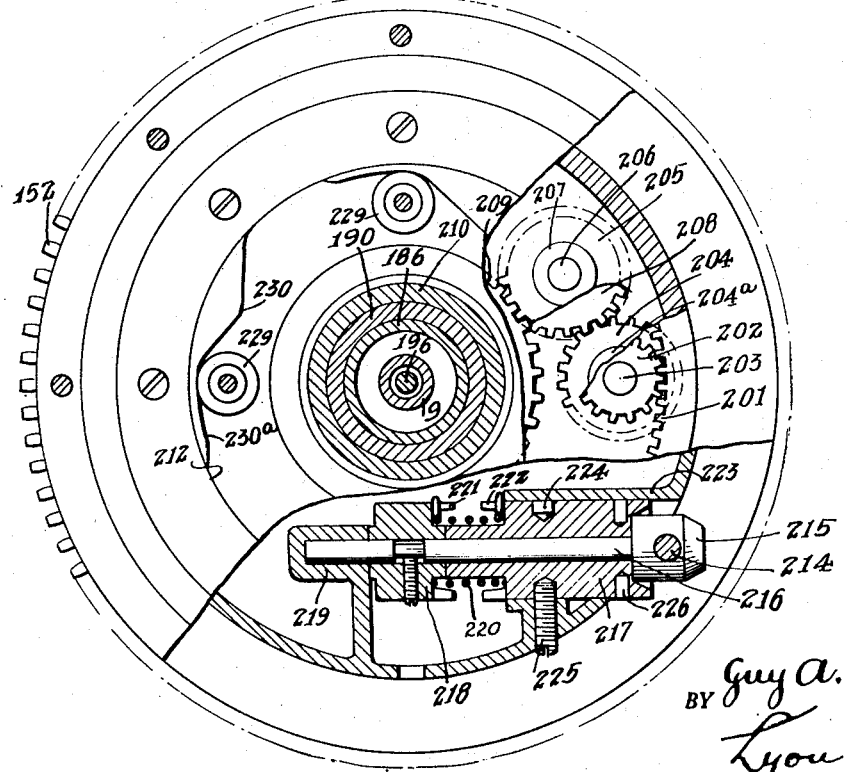
INVENTOR.
Guy A. Dunn
BY Lyon & Lyon
ATTYS.

Aug. 24, 1948.

G. A. DUNN 2,447,640

METHOD AND APPARATUS FOR ORIENTING,
PEELING, HALVING, AND CORING PEARS

Filed Oct. 5, 1942

INVENTOR.
Guy A. Dunn
BY Lyon & Lyon
ATTYS.

Patented Aug. 24, 1948

2,447,640

UNITED STATES PATENT OFFICE 2,447,640

METHOD AND APPARATUS FOR ORIENTING, PEELING, HALVING, AND CORING PEARS

Guy A. Dunn, Oakland, Calif., assignor to California Packing Corporation, San Francisco, Calif., a corporation of New York Application October 5, 1942, Serial No. 460,812

20 Claims. (Cl. 146—33)

This invention relates to a method and apparatus for preparing pears for canning.

While the invention I have made is primarily directed to the preparation of pears for canning, my invention is not limited to this use, but is equally susceptible of use in any other desired field where the pear is prepared by peeling, or peeling, coring and removing the seed-pod to prepare such pear for use. This invention contemplates a continuous method and apparatus wherein the fruit is fed and after being fed is passed through a series of operations continuously to complete the preparation. The apparatus and method are of the continuous type as differentiated from the intermittently operating type of machine.

In the successful development of a continuous method and apparatus for the handling of pears, it is necessary because of their irregularity of size, shape and contour to establish points of reference on or in the fruit itself which are correlated and from which all operations are carried out. In accordance with my invention, I therefore establish two points of reference: (1) An axis through the pear which closely coincides with the pear stem axis, and (2) a plane of reference at right angles, or transverse, to this established axis. Utilizing these established references, I work from these points of reference in carrying out all the operations required for the preparation of the pear for use.

It is therefore an object of my invention to provide a method of preparing a pear for use which includes the establishment of two transverse reference points on or in the structure of the fruit.

It is another object of my invention to provide a method of preparation of a pear for use which is of the continuous type, i. e., where the pears are continuously brought into the method and are continuously operated upon until they are completely peeled, cored, seeded and halved.

Another object of my invention is to provide a method of preparing pears for use such as canning which includes the locating or positioning of pears to determine a reference axis upon which the pear is held while determining a reference plane transverse to the axis from which reference plane the pear is held during the peeling operation which is carried on in the direction toward the reference plane.

Another object of my invention is to provide a method of preparing pears for use such as canning, which includes the establishment of transverse points of reference from both of which points of reference the pear is held during peeling and one of which points of reference determines the coring and seed-pod-removing operations.

Another object of my invention is to provide an apparatus for preparing pears for canning which is of the continuously operating type into which the pears may be continuously fed, positioned, and upon which transverse points of reference are established and from which transverse points of reference all operation upon the pear are performed as, for example, peeling, coring, seed-pod removing and halving.

Other objects and advantages of this invention it is believed will be apparent from the following detailed description of a preferred embodiment thereof as illustrated in the accompany drawings.

In the drawings:

Figure 9 is a detached elevation diagrammatic in character of the calyx end axis locating means of the feed head.

Figure 10 is a plan view of the structure illustrated in Figure 9.

Figure 11 is a detached elevation partly in vertical section of the reference planes forming the calyx and stem ends trimming means embodied in my invention.

Figure 12 is a diagrammatic view of the cam control means for operating the feed head.

Figure 13 is a fragmental sectional elevation of the peeling and coring turret embodied in my invention.

Figure 16 is a detached sectional elevation of a peeling head embodied in my invention.

Figure 17 is a sectional plan view partly in broken horizontal sections to illustrate the peeling arm holding and actuating means and the gear operating and cam control means therefor.

Figure 18 is a perspective view of the peeling members.

Figure 19 is a view diagrammatic in character illustrating the pear peeling operation.

Figure 20 is an elevation of the pear seed-pod removing mechanism embodied in my invention.

Figure 21 is a sectional view taken substantially on the line 21—21 of Figure 20.

Figure 22 is a sectional view taken substantially on the line 22—22 of Figure 20.

Figure 1:
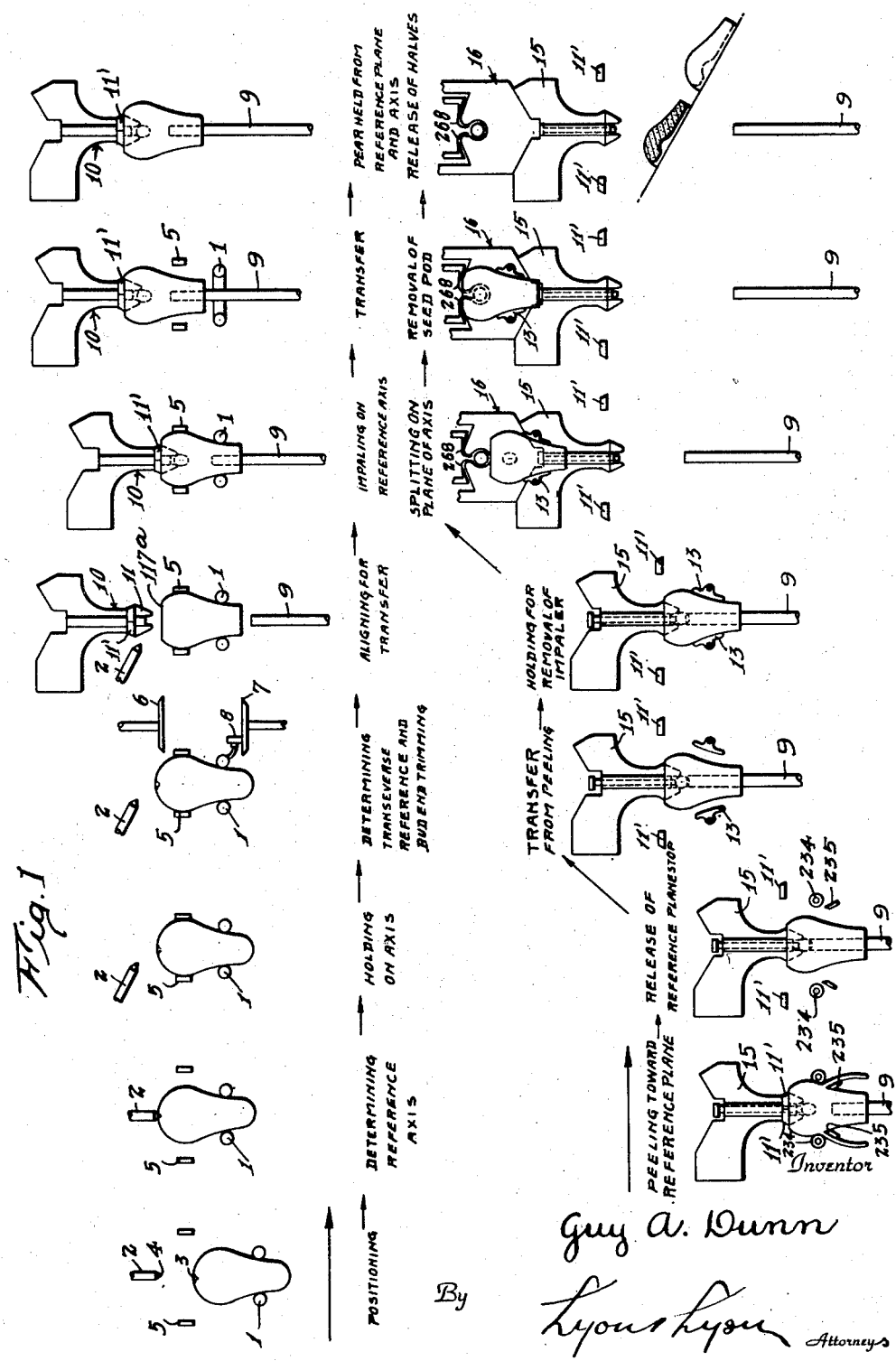
Figure 1 is a diagrammatic illustration of the invention and method embodied in my invention illustrating the operations as performed upon the pear.

In describing my invention, I have diagrammatically illustrated the method of my invention in Figure 1 wherein it is illustrated as: The pear which is to be peeled, cored, split into halves, and from which the seed-pod or area containing the seeds is to be removed, is fed to a feed ring 1, the opening of which is of a diameter sufficient to receive the small or stem end of a pear but is insufficient to permit the larger or calyx end of the pear to pass therethrough. In this ring 1 the pear is therefore held when quickly thrust into the ring 1 in a substantially vertical position.

In order to establish a reference axis from which the operations are performed, the pear is centered on the ring 1 through the medium of a center 2 which passes into the calyx 3 of the pear, establishing in cooperation with the ring 1 a vertical axis through the pear. The center 2, operating in the calyx through the medium of its center point 4, acts to establish this reference axis at approximately the stem axis of the pear. With the pear thus positioned, it is then gripped by means of clamps 5 from its exterior which hold the pear in the established position before the center 2 is withdrawn.

As will hereinafter be set forth, the clamps 5 are of the compensating type so that they compensate for the position of the pear as held by the ring 1 and center 2 and are then locked in this compensating position as they act to clamp the pear.

The pear is then progressed between a reference plane cutting disc 6 and the stem end trimming disc 7. As will hereinafter be described, the position of the ring 1 vertically is determined by the length of the pear and operatively associated with the ring 1 is a cam roller 8 which acts to depress the stem end trimming disc 7 to the proper point for the cutting away of a point of the stem end of the pear to remove the protruding stem.

The depressing of the ring 1 in accordance with the length of the pear fed into the ring, also in cooperation with the center 2, establishes the position of the calyx end of the pear so that when passing under the reference plane cutting disc, only a small portion of the calyx end of the pear is removed.

After passing between the trimming discs 6 and 7, and while still held by the clamps 5, the pear passes into the transfer zone illustrated in Figure 1 as "aligning for transfer" where a stemming tube 9 is brought into alignment with the reference axis established through the pear and at the same time there is brought into alignment with this axis the impaling blade 11 and calyx end reference stop 11'.

Prior to transfer of the pear from its position in the feed mechanism and from its established position as determined by the feed ring 1 and clamps 5, the stemming tube 9 is thrust up along the established reference axis as the impaling member 11 is thrust down into the calyx end of the pear until the reference plane stop 11' is engaged upon the plane surface determined by the reference plane cutting disc 6. With the pear as thus gripped, it is elevated from the ring 1 as the clamps 5 are released and the stemming tube 9 passes through the opening formed in the feed ring 1, completing the transfer of the pear into the peeling and coring turret. During the lifting of the pear from the ring the stemming tube 9 travels further along the stem reference axis and continues to be fed therealong during peeling operations.

Thus as the pear is progressed through the peeling operation, the stemming tube 9 is continuously advanced along the reference axis of the pear through the flesh of the pear to maintain the pear firmly against the reference plane stop 11' against any tendency of the pear to drop out of position during the peeling operations. Thus it will be observed in Figure 1 that throughout the operations of transfer and peeling and until the pear is transferred off from the stemming tube 9, the stemming tube 9 is progressively fed along the axis to maintain the reference plane end of the pear firmly forced against the stop 11'. As thus supported upon the stemming tube 9 and as held from rotation by means of the blades 11, the pear is peeled by a plurality of peelers 12 which peel upwardly and spirally as will hereinafter be set forth in the direction of the reference plane stop 11'. When the peeling operations are completed, the stop 11' is withdrawn as is indicated in Figure 1 at the step entitled "Release of reference plane stop," and while the pear is held upon the stemming tube 9 and impaling member 11, it is gripped from the exterior by means of a pair of transfer clamps 13 which then act to force the pear in the direction of its reference axis along the tube 14 of the splitting member 10 over the blades 15 of the splitting member 10, which completes the splitting of the pear into the two halves as the pear is located over the seed-pod-removing knives 16 carried within a supporting blade 17.

As the pear is located with its seed-cavity in proper position with relation to the coring knives 16, the knives 16 are rotated to cut out the core and, as will hereinafter be set forth, to trim and shape the calyx end of the pear.

The two halves of the pear are then released or discharged from the machine. It will be observed that throughout the operation of this method and through each element as illustrated in Figure 1, the operations are conducted from the two references established, namely, the reference axis and the reference plane. Through each step there is provided a tube similar to the stemming tube 9 which maintains the pear on the reference axis as established by the center 2 and ring 1.

The machine embodying my invention includes a feed turret A and a peeling turret B which may be operatively connected in timed relationship as disclosed in my copending application, Serial No. 355,988, filed September 9, 1940, for Pear peeling machine. The feed turret A, in accordance with the preferred embodiment of this invention, includes the feed ring 1 into which the neck of the pear is fed with the stem end of the pear down. The feed turret also includes the centering pin 2 through the medium of which, in conjunction with the ring 1, the vertical reference axis is established. Also the feed turret includes the clamps 5 for holding the pear on the established axis and the cutting discs 6 and 7 through the medium of which the reference plane transverse to the reference axis is established and the stem and calyx ends of the fruit are trimmed.

Figure 3:
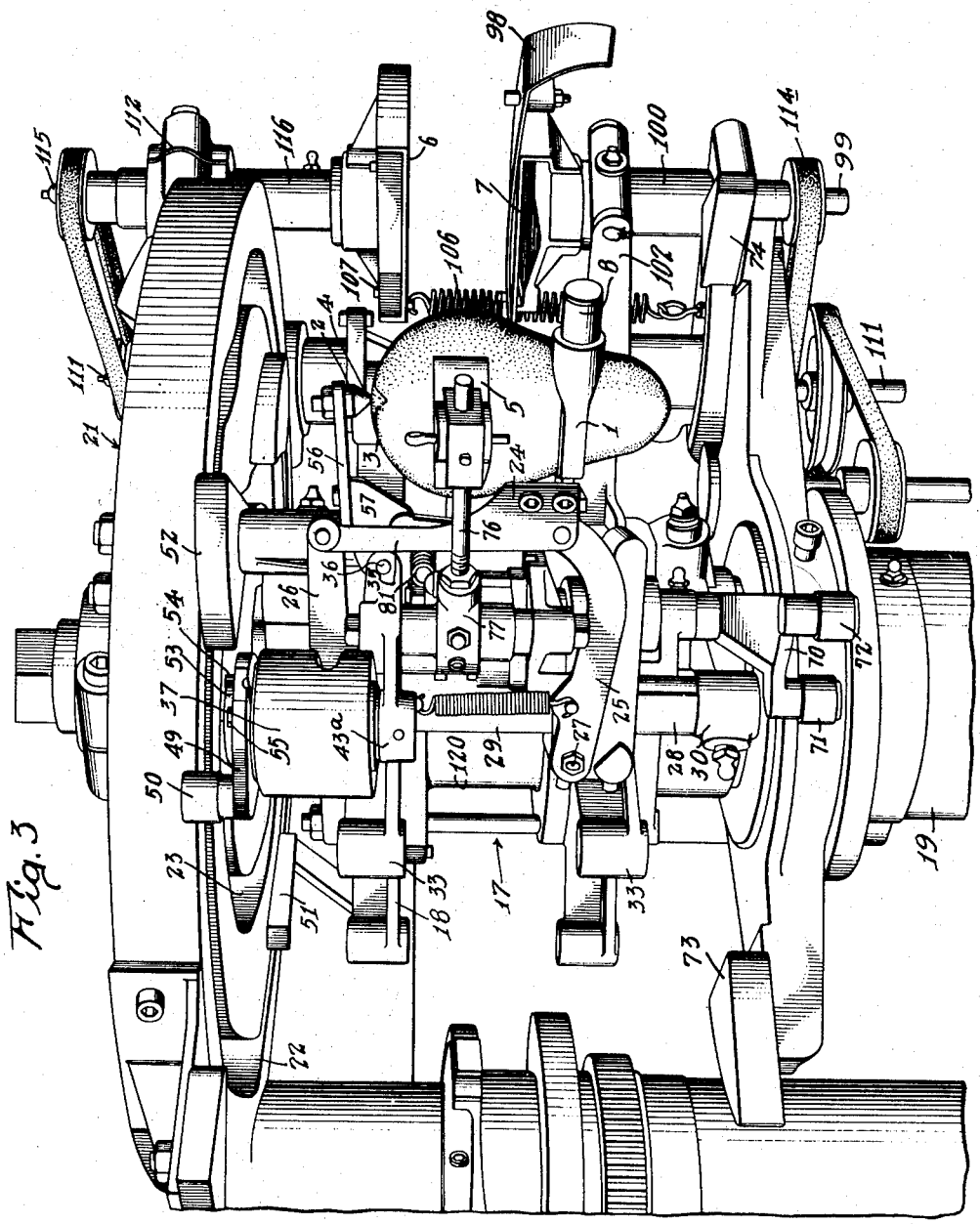
Figure 3 is a perspective view of the feed head.
Figure 4:
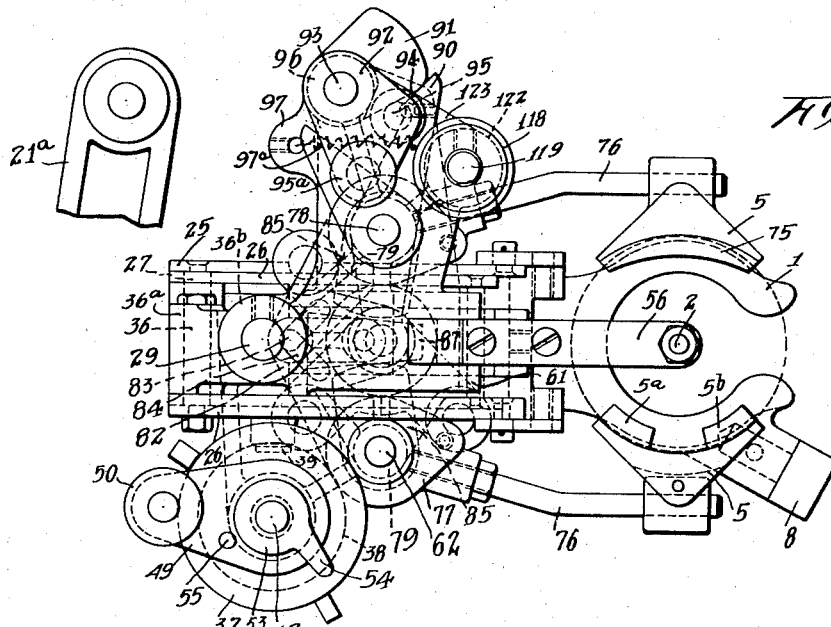
Figure 4 is a plan view of one unit of the feed turret.

The means for operating these instrumentalities may be as follows: The feed mechanism, including the ring 1, center 2 and clamps 5, are all carried in and are operated from a feed head 17 (Fig. 3). In the machine of my invention there are a plurality of such feed heads supported by the feed head revolving bracket 18, which is mounted upon the standard 19 and is secured to the feed head shaft 20. As the feed heads 17 are all of the same construction, I have herein illustrated one only of such heads, together with its operating mechanism, for the purpose of simplicity.

Figure 5:
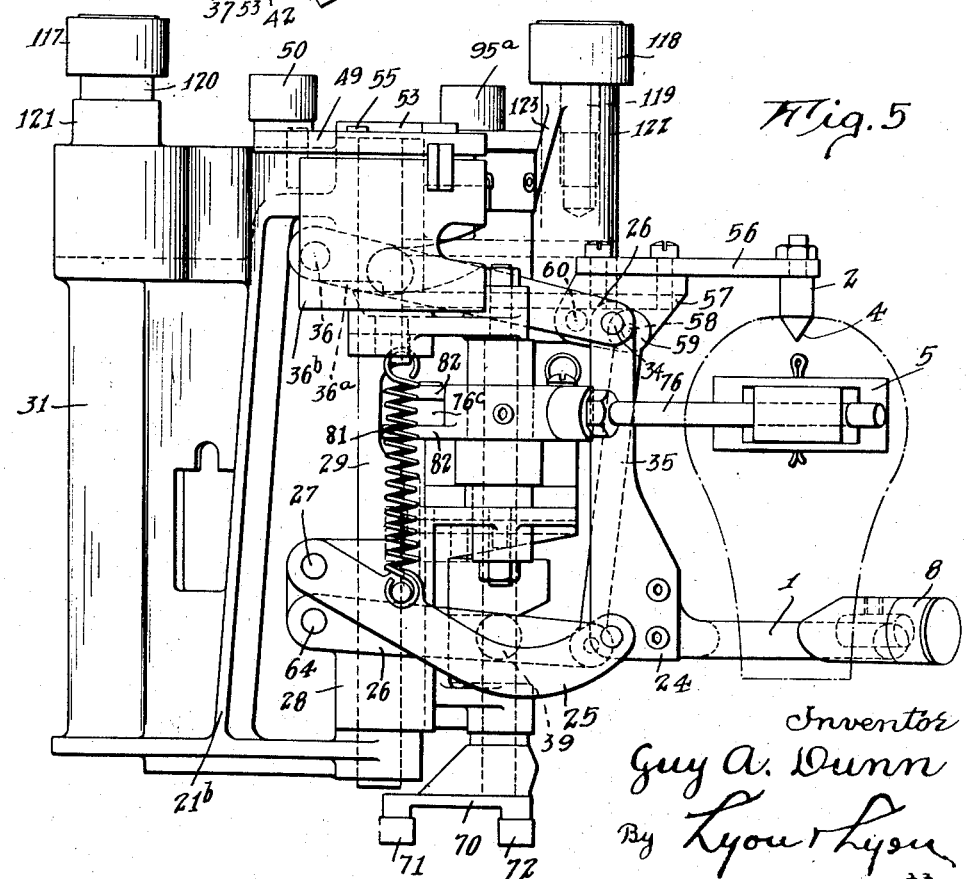
Figure 5 is an elevation of one unit of the feed turret.
Figure 6:
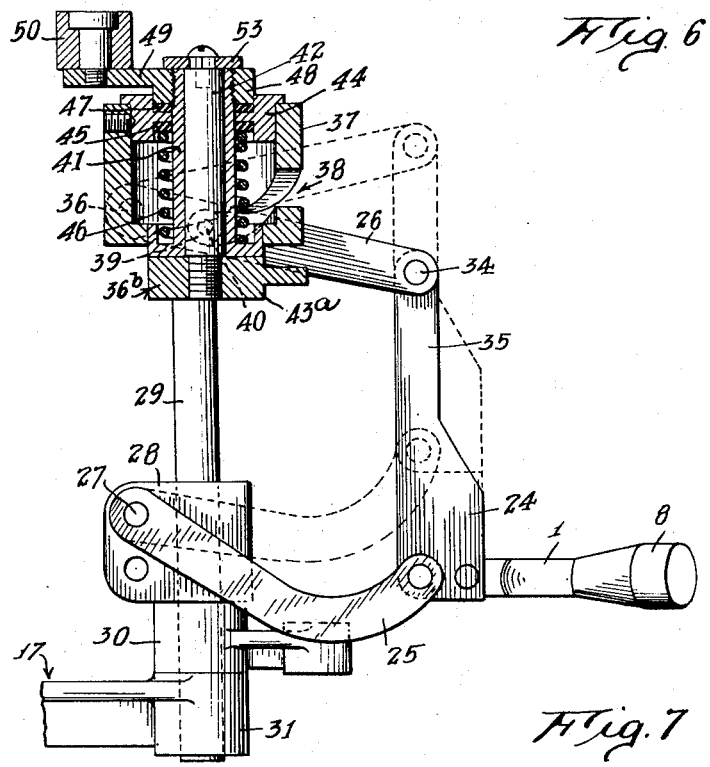
Figure 6 is a detached elevation diagrammatic in character of the feed ring and actuating means therefor illustrated partly in section.
Figure 7:
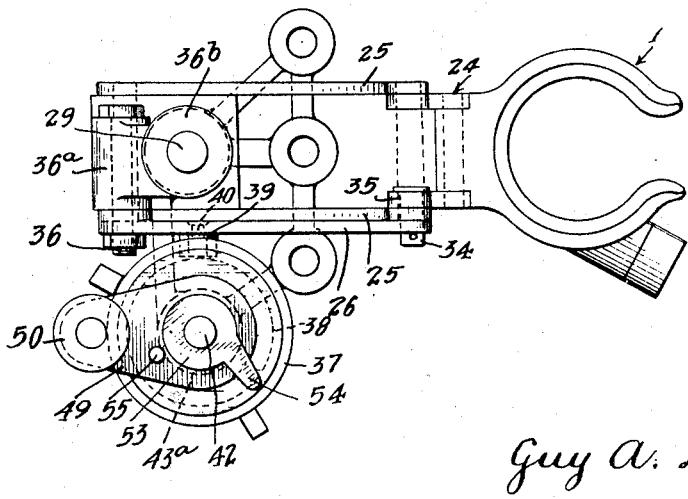
Figure 7 is a plan view of the feed ring means of Figure 6.

Supported by the standard 19 and held stationary is a cam plate 21 which has a pair of cam races 22 and 23 formed therein for cooperation with the cam rollers carried on the operating arms of the feed head 17 as will hereinafter be set forth. The feed ring 1 is carried in the feed head 17 in such manner that its vertical position in the machine will be adjusted with relation to the length of the pear that it receives. The feed ring is thus carried by a supporting bracket 24 (Figs. 5 and 7) which in turn is pivotally secured to parallel links 25 and 26. The links 25 are pivotally secured at pins 27 carried by the bracket 28. The bracket 28 is secured to a shaft 29, which shaft is in turn journaled in the boss 30 of the oscillating plate 31 of the feed head 17. The plate 31 is pivotally mounted upon a supporting pin 32 which in turn is journaled in the ears 33 of the bracket 18. The link 26 is pivoted on a pin 34 carried by the vertical arm 35 of the bracket 24. The link 26 is pivoted on a pin 36 at its other end. The pin 36 is in turn journaled in a boss 36ª on the supporting bracket 36ᵇ. The bracket 36ᵇ is secured to the shaft 29.

Means are provided for holding the ring 1 in position as determined by the length of the fruit, which means include a resistance brake which is operatively connected with the link 26 to enable initial determination of the position of the ring 1 according to the length of the fruit mounted therein.

This resistance means is preferably of the following construction and includes a cylinder 37 having a cam slot 38 formed therein. The cam slot 38 is formed of such pressure angle as to lock the ring 1 in determined position. A cam roller 39, carried by the link pin 40, fixed on the arm 26, travels in the cam slot 38. The cylinder 37 is mounted on a bushing 41 through which the securing pin 42 is passed and threaded into an arm 43ª formed integral with the boss 36ª which is mounted upon the shaft 29. The cylinder 37 also is secured to the friction disc 44 which carries a friction washer 45 against which a spring 46 mounted upon the bushing 41 exerts its pressure. A friction washer 47 is positioned on the other side of the friction disc 44 and is engaged by the boss 48 formed on the end of the lever 49. Carried on the free end of the lever 49 is a cam roller 50 which is adapted to engage the fixed spot cams 51 and 52 (Figure 3) carried by the cam plate 21. The lever 49 is threaded to the upper end of the bushing 41.

A cap 53 is secured to the pin 42 and is formed with a stop arm 54 adapted to engage a stop pin 55 carried on the lever 49 to limit the rotation of the cylinder 37. As the feed head 17 is rotated (Figure 12), the cam roller 50 will first engage the spot cam 51, lowering the feed ring 1 to the lowermost position to receive the pear. After the pear is fed into the ring 1, the cam roller 50 engages the second spot cam 52, raising the ring.

The amount of raising of the ring 1 is dependent upon the length of the pear. The ring 1 will be raised only the amount as will properly position the calyx end with relation to the centering pin 2 which will arrest upward movement of the pear.

The further tendency of the roller 50 passing along the cam surface of the spot cam 52 to raise the ring 1 will overcome frictional resistance of the friction discs 45 and 47 operating against the friction disc 44, permitting movement of the cam roller 50 without rotation of the cylinder 37.

Prior to the ring 1 being moved upwardly, the center 2 is moved down into position to pass into the calyx end of the pear and provide the stop to arrest upward movement of the pear. The stop provided by the center 2 determines the position of the pear at which the reference plane cutting disc acts.

The ring 1 is made in varying sizes for different sizes of fruit, which are generally graded before peeling.

The center 2 (Figures 9 and 10) is carried at the end of an arm 56, which arm 56 is in turn secured to a toggle plate 57. The plate 57 is pivotally connected by means of a pin 58 with the actuating links 59. The plate 57 is also connected by means of a pin 60 to the ears 61 of the stationary arm 43ª carried by the shaft 29.

The opposite end of the links 59 are pivoted to actuating links 63. The actuating links 63 are in turn pivotally connected at a pin 64 to the bracket 28 journaled on the shaft 29. The actuating links 63 carry a cam roller 65 which is adapted to ride in the cam slot 66 of the cam 67. The cam 67 is journaled in a boss 68, which boss is formed as an extension of the bracket 28. Secured to the cam shaft 69 is a double cam arm 70 carrying spaced cam rollers 71 and 72. The cam rollers 71 and 72 are adapted to engage the spot cams 73 and 74 carried by the cam ring 21 (Figure 12). The cams 73 and 74, acting in conjunction with the rollers 71 and 72, determine the intervals of raising and lowering of the center 2 during the operation of the machine, as will hereinafter be described.

The pear as fed into the ring 1 is positioned therein by means as above described and is thus positioned with its stem end down in such manner that there is established through the pear a reference axis determined by the center 2 and the ring 1.

In accordance with my invention this reference axis is maintained through subsequent operations.

In order to maintain this axis while the calyx end of the pear is being cut to form the reference plane transverse to the reference axis, clamping means are provided which are adjusted to the pear surface and when adjusted are locked in adjusted position to hold the pear firmly on the reference axis while the reference plane is being formed and while the pear is being transferred from the feed head to the peeling turret and during the downward thrusting of the impaling blade 11 and the thrusting of the stemming tube

Figure 8:
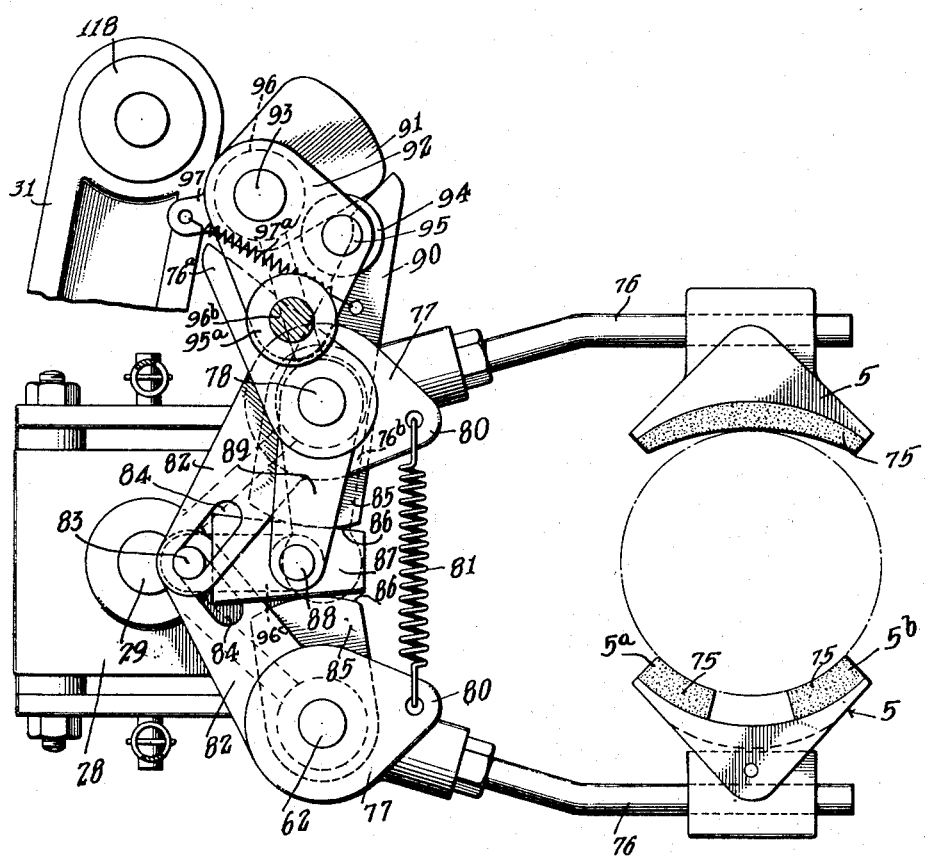
Figure 8 is a detached plan diagram of the feed head pear-holding clamps and actuating means.

6 upward into the flesh of the pear along the reference axis. This clamping means may be of the following construction and mode of operation:

The clamps 5 are preferably of concave shape and their gripping faces may be lined with resilient pads 75 formed of any suitable material such as soft or sponge rubber. The two clamps 5 together provide a three point gripping of the butt of the pear as will be hereinafter specifically described. The clamps 5 are carried on the clamp arms 76 (Fig. 8) on diametrically opposed positions with relation to the pear to engage the outer surface of the pear, preferably at or near its butt. The arms 76 are carried by toggle brackets 77, one of which is journaled upon the shaft 62 and the other of which is journaled upon a parallel shaft 78. The shaft 78 is journaled in a bracket 79 formed as an extension of the bracket 36[b].

The corresponding arms 80 of the brackets 77 are connected by means of a spring 81 which acts to rotate the arms 76 to a position to contact the clamp 5 with the previously positioned pear. The other arms 82 of the toggle brackets 77 are connected together by means of a pin 83 adapted to ride in the slots 84 formed in each of the arms 82.

Carried by each of the shafts 62 and 78 are concentric lock plates 85 which extend toward each other and are provided with curved ends 86 forming lock surfaces between which a wedge 87 is adapted to be thrust to hold the clamps in position of engagement with the surface of the pear after they have assumed their positions as determined by the position of the pear in the ring 1. The wedge 87 is carried on a pivot pin 88 at the end of the lock arm 89. The lock arm 89 is in turn journaled on the shaft 78.

Means are provided for actuating the wedge 87 to move the same into position between the lock plates 85 and for extracting the lock plate when it is desired to open or close the clamps 5. This means is preferably of the following construction: Formed as an extension of the lock arm 89 is a lock release arm 90. This lock release arm 90 is positioned to be engaged by a cam 91. The cam 91 is secured to the shaft 93. Also secured to the shaft 93 is a cam bracket 92.

Carried in the cam bracket 92 is a cam roller 94 and a cam shaft 95. The shaft 93 is journaled on a boss 96 which has an extension arm 97. Secured between the extension arm 97 and the lock release arm 90 is a spring 97[a] which normally acts to urge the arm 90 in a counter-clockwise direction, which thereby acts to urge the lock wedge 87 between the lock faces 86 of the lock plates 85, thus locking the clamps 5 in their contacting position against opening. Also journaled on the shaft 78 is a cup actuating arm 76[a]. The arm 76[a] is positioned to be engaged by the cam roller 94. Secured to the shaft 78 to rotate with the arm 76[a] is a cup release arm 76[b] which is connected through the medium of a release plate 76[c] to the pin 83. Secured to the cam shaft 93 is the cam roller 95[a] which is carried on a shaft 96[b] secured to the bracket 92. This cam roller 95[a] is adapted to engage the spot cams 95[b] and 95[c] carried by the cam ring 21 (Figure 12). Thus as the feed turret rotates and the roller 95[a] engages the spot cams 95[b] and 95[c] the opening and closing of the clamps 5 is controlled. When the clamps 5 adjust themselves to the contour of the pear as permitted by the pin 83 riding in the slots 84, with the cam 91 out of engagement with the lever 90, the spring 97[a] acts to force the wedge 87 into position between the lock plates 85, thereby locking the cups in contact and against the pear.

With the fruit clamped between the clamps 5 on its previously determined reference axis, the feed head 17 moves forward to the position where the two ends of the pear are cut. During this movement the center 2 has moved away from the pear calyx as heretofore described. The calyx end of the pear is cut to form the flat reference plane transverse to the reference axis and the stem end of the pair is cut to trim the fruit and remove the protruding stem. For this purpose I employ the reference cutting disc 6 and the stem end trimming disc 7 (Figure 11). The two clamps 5 (Fig. 8) are formed to provide a three point contact with the butt of the pear. One clamp 5 is formed with spaced clamp sections 5[a] and 5[b] while the other clamp 5 is formed with a contact surface of a radius greater than the radius of the butt of the pear. The two point clamp is pivotally supported on the holder so as to have freedom of movement to enable the same to rotate to position to contact at the two points. The one point clamp is fixed to its supporting rod 76.

Carried by the ring 1 is the cam roller 8 which engages the slide arm 98 to move the stem end trimming disc 7 downwardly a distance determined by the position of the ring 1 as fixed by the length of the pear. The cutting disc 7 is secured to a shaft 99, which shaft is journaled in a bearing 100. The bearing 100 is connected to the parallel links 101 and 102 which are in turn pivotally secured by the pins 103 and 104 to the shaft housing 105. A spring 106 is connected with one of the links 101 at one end and at its opposite end to the plate arm 107 of the shaft housing 105. The spring acts to yieldably urge the disc 7 to its uppermost position as determined by the limiting arm 108 having the arcuate slot 109 in which the pin 110 carried by the housing 105 fits. The drive shaft 111, together with its housing 105, is supported in a bracket 112 secured to the cam plate 21.

The bearing 100 is supported by the parallel links 101 and 102. The shaft 111 is driven through a suitable pulley and belt drive from a countershaft 113 (Figure 2) supported in a bearing mounted upon the standard 19. The pulley and belt connection 114 connects the shafts 111 and 99 in driving relation.

Supported in an extension of the bracket 112 is the reference plane cutting disc drive shaft 115. The reference plane cutting disc 6 is secured to and driven by this shaft. The shaft 115 is supported in the bracket 112 in a journal housing 116. The shaft 115 is driven by a suitable drive connection from the shaft 111.

From the foregoing it will be seen that as the pear is moved between the discs 6 and 7, there is formed at the calyx end of the pear the reference plane 117[a] while the stem end of the fruit is being trimmed by the cutting disc 7.

The operation of the feed head 17 around the feed turret may be similar to that disclosed in my copending application, Serial No. 382,650. The similarity may be such that the feed ring is caused to pause as the head 17 continues to rotate in order to give a longer period of time for the operator to feed the pear into the ring.

As in my copending application herein referred to, at the instant of transfer of the pear from the feed turret A to the peeling turret B, the movement of the ring 1 and its counterparts of the feed turret 17 may be caused to travel the arc of movement of the stemming tube 9 around the main turret. As, however, this particular method of operation and the mechanism for accomplishing it is the subject matter of my copending application, Serial No. 382,650, and as the invention of my present application is not limited to either the provision of the dwell of the feed ring 1 during the feeding operation or causing the feed ring 1 and its counterparts to travel the arc of rotation of the stemming tube 9 during transfer, I have not deemed it necessary to herein set forth fully the means which are provided for effecting such a dwell or for causing the continuity of travel of the feed ring 1 and stemming tube 9 during the instant of travel. The only modification of the means provided for operating the feed head 17 and for controlling its movement during the time it is traveling around the column 19 as compared with the disclosure of my copending application, Serial No. 382,650, is found in the plate 21. In this plate 21 I have formed the two cam tracks 22 and 23 in which the cam rollers 117 and 118 are mounted. The cam roller 118 is mounted on the cam shaft 119. The cam roller 117 is journaled on the shaft 120. The shaft 120 is supported in the boss 121 formed integral with the casting from which the arm 43ª is extended.

The oscillating plate 31 which supports the feed head 17 is an angled plate including the two angled sections 21ª and 21ᵇ. The feed head 17 is journaled on the shaft 29 at the outer end of the angled section 21ᵇ. The shaft 120, supporting the cam roller 117, is journaled in a sleeve 122 formed at the end of the arm 123 secured to the shaft 93.

The cam races 22 and 23 (Figure 3) are so formed as to act in cooperation with the cam rollers 117 and 118 (Figure 5) as to cause the plate 31 to have a movement when passing around the standard 19 substantially as described in my copending application, Serial No. 382,650, hereinabove referred to, i. e., to cause the feed head, or rather the feed ring 1, to dwell at the feeding position so as to give the operator a longer period of time to position the pear in the feed ring and also as to cause the feed ring 1 to travel in a direction conforming with the arc of travel of the stemming tube 9 during the interval of transfer of the pear from the feed turret or feed device to the stemming tube 9 of the peeling turret B.

With the pear thus transferred to the stemming tube 9 and held from rotation by means of the impaling member 11, the same is carried around the peeling turret on the stemming tube 9 during the peeling operation and until the pear is transferred from the stemming tube 9 onto or over a splitting blade 10 and to position on the plate 15 with relation to the coring knife 16, as will hereinafter be set forth.

In all of these operations the reference axis formed in the pear and the reference plane formed by the cutting disc 6 provide reference points from which the operations are performed.

The peeling turret embodied in the machine of my present invention includes means for carrying out the operations of (1) impaling the fruit on the stemming tube 9, (2) peeling the fruit, (3) transferring the peeled fruit by the medium of the exterior clamps 13 off of the stemming tube 9, and conveying the fruit over the splitting blade 10. Prior to movement of the fruit off the stemming tube 9, the reference stop 11' is moved out of stopping position. (4) Coring and shaping the calyx end of the fruit while held by the clamps 13 so that when the clamps 13 are released the two peeled, cored and trimmed halves of each pear may be discharged from the machine.

In these operations the impaling turret is of the same construction as set forth in my copending application, Serial No. 355,988, filed September 9, 1940, with the exception that (a) the peeling means is of a different construction and operates upon a different mode of operation from that set forth in my said earlier application above referred to; (b) the means provided for actuation of the reference plane stops 11' to move the stops into and out of position during the different steps of the operation of the machine, which means are not found in my copending application, and (c) the provision of a modified form of calyx end trimming means which operates in conjunction with the fruit coring means. Therefore, in describing the machine as herein illustrated, it is deemed only essential to set forth the differences and additions to the pear preparation machine of my earlier copending application. For the specific and detailed operation of the main turret, reference is had to my said copending application.

As in my copending application, the main turret includes a stationary central column 126 mounted upon the base plate 125. The main turret operating means is supported upon, and rotates around, this column 126. Journaled on the column 126 is a spider 127 which is driven by the gear 128 which meshes with the main drive gear 129. The drive gear 129 is journaled upon the shaft 120 of the feed turret so that a timed relationship is established between the drive of the feed turret and the spider 127. The spider is formed with an internal ring gear 130 and a plurality of spider arms 131. The arms 131 receive drive rods 132 which pass through bosses 133 formed in the peeling plate 134, whereby the peeling plate 134 is caused to revolve with the spider 127. Secured to the column 126 above the spider 127 is a stemming tube 9 reciprocating cam ring 135.

The means in the peeling turret for actuating the stemming tube 9 are similar to the means as set forth in my aforesaid copending application, the difference being primarily in the formation of the stemming tube actuating cam ring 135, which is secured to the column 126 above the spider 127. In this case the cam ring is formed in such manner as to produce a vertical movement of the stemming tube 9 so that after the stemming tube 9 impales the fruit thereon at the interval of transfer of the fruit from the feed turret to the main turret, the stemming tube 9 is caused to continue its vertical movement at a rate to at all times maintain an upward thrust along the stem of the fruit so that the fruit is continuously urged upwardly against the reference plane stop 11' during the peeling operation and until the fruit is gripped from the exterior by means of the cups or clamps 13 when the stemming tube 9 is withdrawn from the fruit and is returned to the position to be impaled through another fruit. The difference in construction therefore is only in the formation of the cam ring 135 and in other respects the means for actuating the stemming tube 9 is the same as in my aforesaid copending case.

The means for driving the peeling assemblies and for driving the outer column 136 in my present machine, as well as for driving the reference stop 11' actuating means, differ from those of my copending application. This drive is so formed as to provide a means in conjunction with the peeling assemblies which permits the changing of the number of cuts made on each pear in cutting the peeling therefrom as will hereinafter be described. This change of the number of cuts made in removing the peeling from a pear is particularly advantageously employed in handling pears of different sizes to insure a minimum of waste of fruit in the peeling operation.

The drive means as herein illustrated includes a pinion shaft 137 which is journaled in a boss 138 formed in the cam ring 135. Secured to the shaft 137 is a pinion 139 which meshes with the teeth of the internal ring gear 130. On its opposite end the shaft 137 is secured to a pair of gears 140, 141. These gears 140 and 141, as will hereinafter be set forth in further detail, drive the cylindrical sleeve 142 through gear teeth 143 formed thereon.

Figure 14:
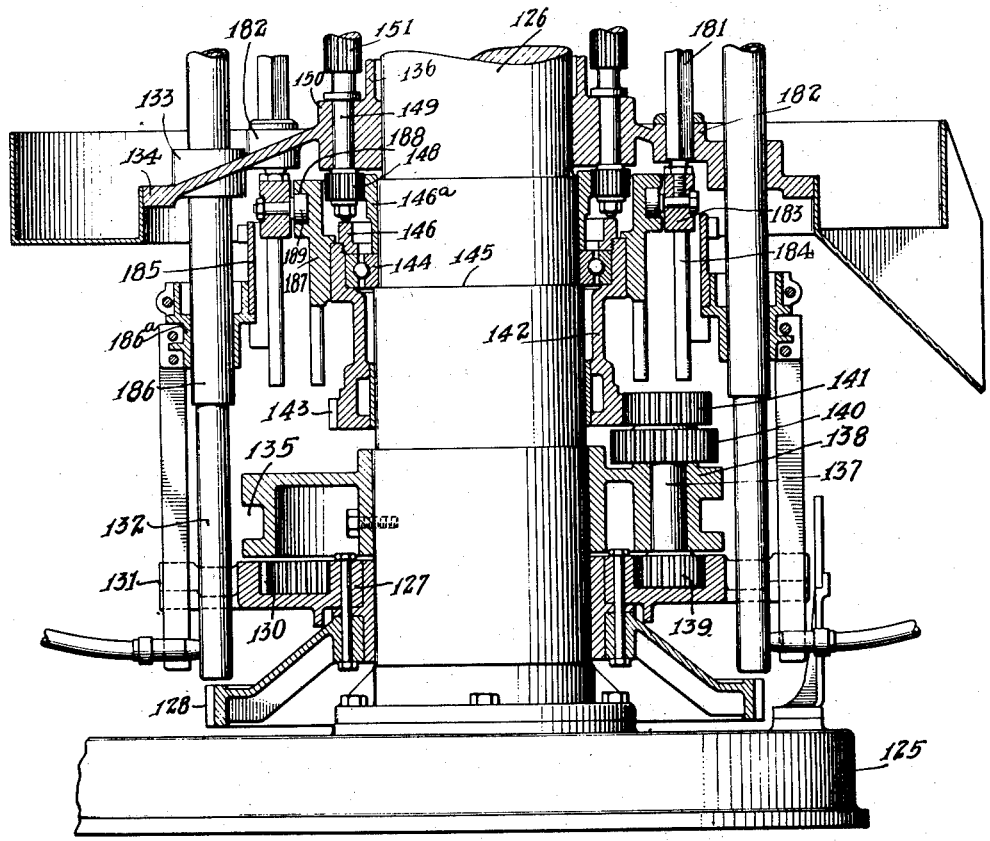
Figure 14 is a sectional elevation of the remaining portion of the peeling turret illustrated in Figure 13.

As illustrated in Figure 14, the pinion 141 is in mesh with the teeth 143. The cylindrical sleeve 142 is journaled on a bearing 144 positioned upon a shoulder 145 of the column 126. A supporting cap 146 is threaded to the upper end of the sleeve 142 and forms the upper retaining and supporting ring for the sleeve 142 and bearing 144. Secured to the upper end of the sleeve 142 is the oscillating peeler head cam ring 187. Secured to the column 126 is a stationary gear ring 146a. Carried by the revolving peeler plate 134 are peeler head pinion shafts 149. There is one such shaft 149 for each peeler head. These shafts 149 are rotated by pinions 148 which mesh with the ring gear 146a. The shafts 149 are journaled in bosses 150 formed through the peeler plate 134.

Formed integrally with the shafts 149 above the peeler plate 134 are elongated peeler assembly drive pinions 151, the teeth of which are elongated in order to maintain mesh with the continuously driven gears 152 of the peeler heads during vertical reciprocation thereof. Above the pinions 151 the shafts 149 are continued and are journaled in supporting rings 153 and 154 carried by the rotating column 136. Above the rings 154 each of the shafts 149 is provided with a drive pinion 155 which meshes with gear teeth 156 of the reference stop 11' actuating cam ring 157. The cam ring 157 is journaled on the rotating column 136 above the ring 154 and remains relatively stationary due to the action of the pinion 155 acting against the gear teeth 156. The cam ring 157 provides the means for actuating the reference stops 11' as will hereinafter be fully set forth.

The rotating column 136 which surrounds the stationary column 126 is driven with the peeling plate 134 due to the drive transmitted through the drive rods 132 which are driven by the spider arms 131 from the spider 127. As the column 136 is an integral part or is rigidly connected to the peeling plate 134, it rotates with the peeling plate 134.

The means provided in accordance with my present invention for actuating the blades 15, the gripping cups 13, and the coring mechanism 16, are the same means which are described in my copending application, Serial No. 355,988, so that they need not be repeated in detail here. As in my copending case, the rotating column 136 is supported upon a thrust bearing 158 positioned upon a shoulder 159 of the stationary column 126 by means of a load-supporting ring 160 which is secured to the upper end of the column 126.

Secured to the column 126 above the bearing 158 is a stationary actuating cam cylinder 161. Mounted to reciprocate within the cam cylinder 161 is the slide 162 which carries the splitting blade 15. This slide is reciprocated due to the action of the cam roller 163 in the cam way 164 formed in the cam cylinder 161. Also mounted within and actuated by the cam cylinder 161 and the rotating column 136 are the actuating means for the gripping clamps or cups 13, the construction and operation of which is the same as in my copending case. Also supported within and actuated in the same manner as in my copending case are the coring units 16 which receive the peeled and split pears after they pass over the splitting blade 10 and while they are held within the clamps 13 upon the blades 15.

Figure 15:
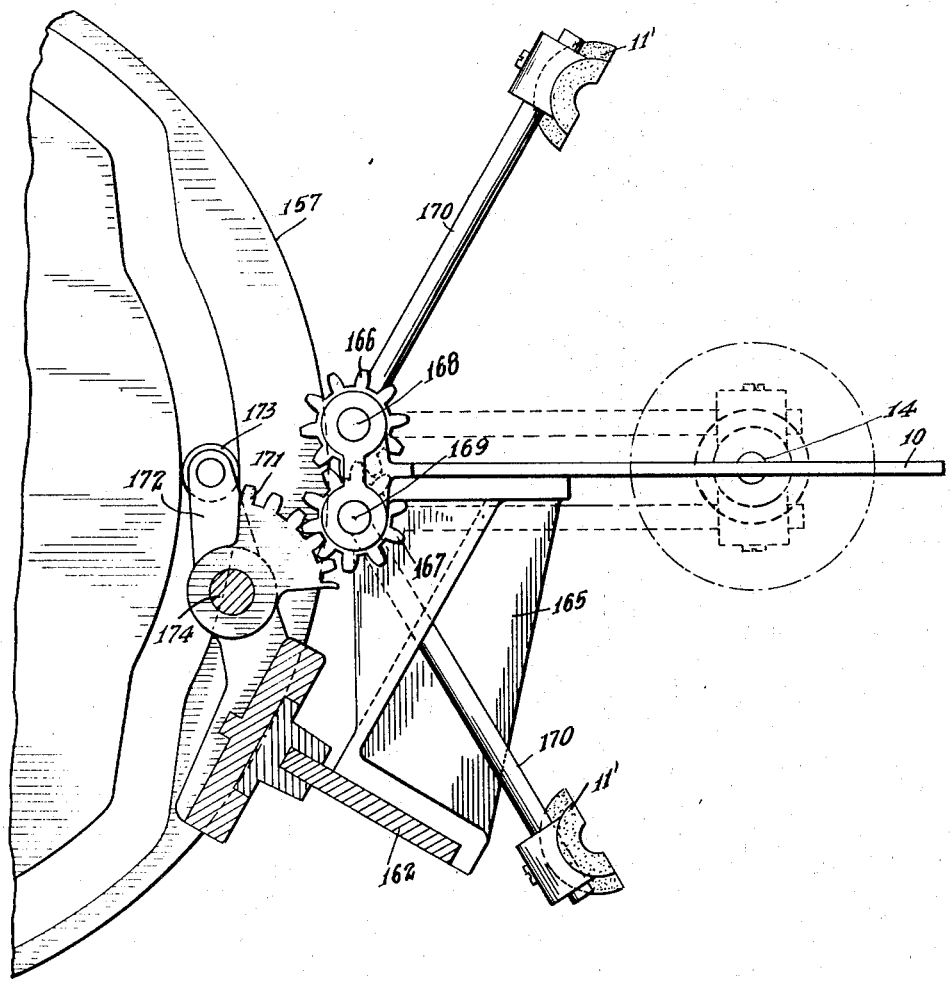
Figure 15 is a diagrammatic plan view partly in horizontal section of the reference plane stop and actuating means embodied in my invention.

The reference stop actuating means as herein illustrated is of the following construction (Fig. 15): Secured to, or formed integral with the impaling blade slide 162 is a bracket 165 within which are journaled a pair of meshing gears 166 and 167.

Secured to supporting shafts 168 and 169 for the said gears are reference stop supporting arms 170 to the outer end of which the halves of reference stops 11' are secured. One of the gears, for example the gear 167, meshes with the gear segment 171 which is formed integral with the cam arm 172 which carries the actuating cam roller 173. The gear segment 171 is journaled on a pin 174 which is journaled in the rings 177 and 178 on the column 136.

The cam ring 157 therefore actuates the reference stops 11' to bring the reference stops around the tube 14 of the splitting member 10 prior to the vertical thrust of the stemming tube 9 along the axis of the pear so that the action of thrusting the stemming tube 9 forces the pear at its previously formed transverse reference plane against the reference stop 11'. The reference stops 11' remain in this position throughout the peeling operation and until the pear is gripped from its exterior by the clamps 13, when the reference stops are moved out of the path of the pear as the clamps 13 act to force the pear across the splitting blade 10.

Figure 2:
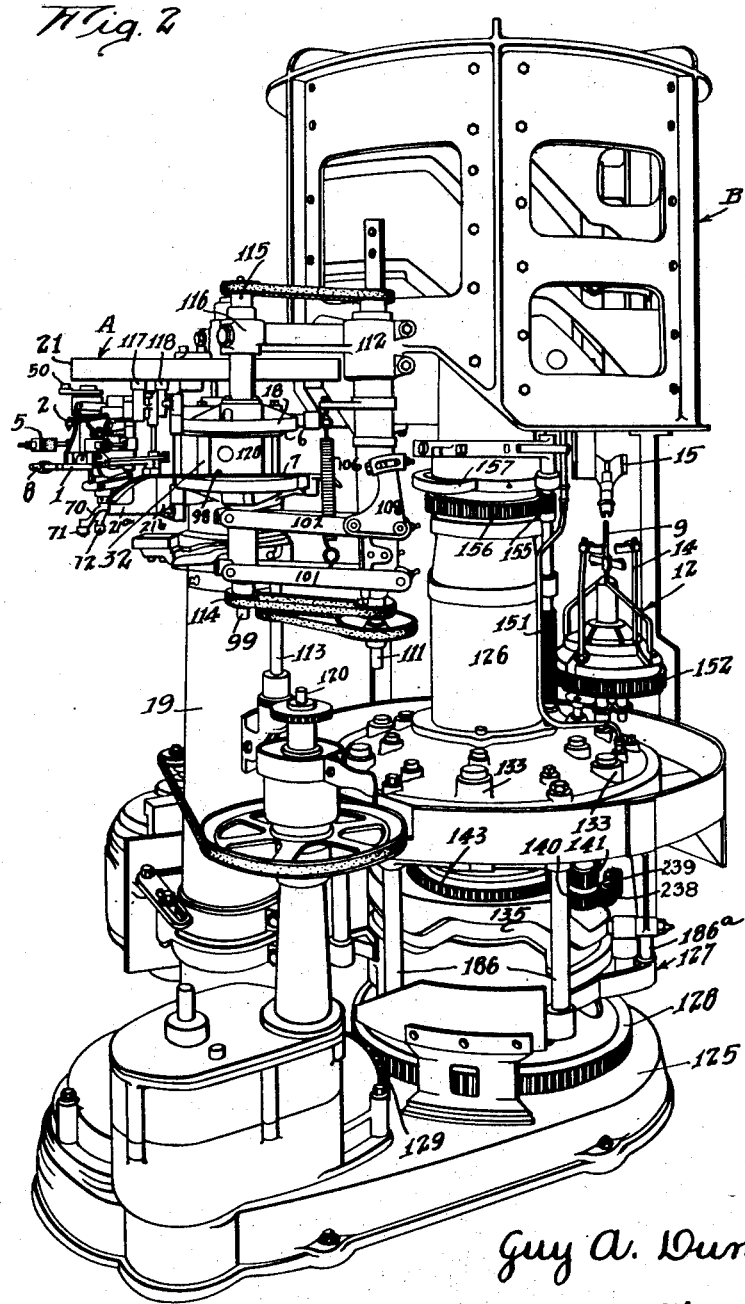
Figure 2 is a perspective view of the pear preparation machine embodying my invention.

The peeling heads of the pear peeler of my present invention are preferably of the following construction and mode of operation:

As in my earlier application, Serial No. 355,988, the main turret carries six peeling assemblies. However, this number may be varied, depending upon conditions. Each of the peeling assemblies includes a base casting 180 which is secured to a square guide rod 181. The guide rod 181 passes through a square boss 182 formed in the peeling plate 134 and is secured to a cam block 183 below the peeling plate 134. The cam block 183 is guided in a vertical way 184 formed in a casting 185 carried by the guide tubes 186 which are mounted on the drive rods 186a (Fig. 2). The cam ring 187 is secured to the sleeve 142 and provides a cam way 188 within which the cam roller 189 carried by the block 183 rides, thus causing the base casting 180 to move vertically as the main turret revolves. The cam ring 187 revolves in the opposite direction to the peeling plate 134 due to the reversing of the direction of drive through the gear chain which drives the cam ring 187. The reversing of the direction of rotation of the cam ring 187 permits me to form the greater cam length required for the multiple reciprocation of the peeling heads.

The base casting 180 is formed integral with an axial sleeve 190 through which the guide tube 186 extends. Mounted axially of the guide tube 186 is the stemming tube 9. The assembly including stemming tube 9 is guided by the guide tube 186. A guide cap 191 is threaded to the upper end of the tube 186. The cap 191 forms a guide for the stemming tube 9 which extends through the axial bore 192 of the cap 191 and is provided with an enlarged guide section 193 through the medium of which the stemming tube 9 is threaded to the tube 194. The tube 194 is in turn threaded to the hollow drive rod 132 at its upper end as illustrated at 195. The guide tube 186 is secured to the peeler plate 134 and to the casting 186a.

As set forth in my copending application, drive rods 132 are reciprocated to provide the means for transmitting the reciprocating motion to the stemming tube 9.

Mounted within the stemming tube 9 is a stem ejector rod 196 which is the same in construction and mode of operation as found in my copending application, Serial No. 355,988.

The driven gear 152 of the peeling unit is journaled on the base casting 180 by means of a base ring 197 and a spacer ring 198 which are secured together and to the gear 152 and to the top casting 199 by means of a plurality of stud bolts 200. The top casting is in turn journaled on the guide tube 186.

Secured to the base ring 197 is an internal ring gear 201 which meshes with a pinion 202 secured to a pinion shaft 203. The pinion shaft 203 is journaled in a boss extension 204a of the base plate 180. At its lower end the shaft 203 carries a removable pinion 204 which meshes with a removable pinion 205 carried by the shaft 206 journaled in a second boss 207 formed from the plate 180. Above the plate 180 the shaft 206 is provided with a drive pinion 208 which meshes with the internal gear teeth 209 of the external ring gear 210. The external ring gear 210 is journaled on the sleeve 190 of the base casting 180. The ring gear 210 is formed with a horizontal plate section 211 which supports the actuating cam ring 212.

In each peeling assembly there are four cutter members 213 (Figures 18 and 19) each of which is supported upon an actuating rod 214. The rods 214 are secured to driver heads 215 which are secured to the drive rods 216. The drive rods 216 extend through bushings 217 and through drive blocks 218 and are journaled in bosses 219 formed in the cover 199.

A torsion spring 220 is interposed between the drive lugs 221 of the block 218, drive lugs 222, and bushings 217. The spring is wound under torsion so as to urge rods 214 to pivot toward the stemming tube 9. The bushings 217 are journaled in the sleeve section 223 formed in the cover 199. The bushings 217 are provided with a plurality of lock apertures 224, any one of which is adapted to receive the lock screw 225. Bushing 217 has a plurality of wrench-receiving apertures 226 which are adapted to receive a rod or wrench so that when the screw 225 is removed from the apertures 224, the bushing 217 may be rotated to increase or decrease the torsion in the spring 220 to thereby adjust the force tending to thrust the rods 214 toward the stemming tube 9. After suitable adjustment of the torsion, the screw 225 is returned into one of the apertures 224 to hold the adjustment. It will thus be observed that the cutting knives 227 of the cutter assemblies 213 are urged toward cutting position under influence of torsion spring 220.

In order to actuate the rods 214 to move the cutters 213 away from the pear 218 after completion of the upward peeling so that the cutters may clear the pear on the downward stroke, the cam rollers 229 pass over the raised portions 230 of the cam ring 212.

It will be observed that the cam ring 212 has immediate surfaces 230a which cooperate with the cam rollers 229 to move the cutters 213 out on the upward cutting stroke from the stemming tube 9 just prior to their reaching the position of the impaling blade 11 and the reference stop 11'. This provision is to safeguard the apparatus when running without a pear on the stemming tube 9. When the pear is on the stemming tube 9 the cutters 213 will ride on the pear surface.

The cutter assemblies 213 are of similar construction and each includes a bracket 231 which is adjustably secured to the rod 214. Each bracket 231 is provided with end arms 232 between which there is journaled on the pins 233 the knife assembly including cutting knives 227 and the contact rollers 234. The rollers are positioned in advance of the cutting edge 235 of the knives 227 so that the contour of the pear is contacted by the contact roller 234 to determine the depth of cut of the knives 227 in removing the peeling from the pear.

From Figure 19 it will be observed that the center of rotation of the cutter assembly of the roller 234 and knife 227 is positioned between the cutting edge 235 and the axis of the contacting roller 234 in such manner that the center of such rotation lies below a line drawn through the center of the axis of rotation of the roller 234 and the cutting edge 235.

The axis for the roller 234 is formed by a pin 236 which rides in arcuate slots 237 formed in the arms 232. From the foregoing it will be apparent that the cuts made are with a straight knife edge and that the cuts as made are vertically upward along the surface of the pear 228 and that as the cutter head is driven in rotation during the advancing of the knives 227, that the cut is in the form of an upward spiral. This forming of the cut in an upward spiral direction enables me to maintain the pear in position against the reference stops 11' and enables me to obtain the advantage of a shear cut due to the relative movement in a spiral direction of the knife edge 235 over the surface. This enables me to make a thinner, more accurate cut which easily follows the contour of the fruit. This method of cutting reduces the impact of the cutting knife against the pear and reduces the liability of crushing the butts of ripe pears against the stops 11'.

As I have illustrated the peeling of the pear it is performed by four cutters, each of which makes three vertical strokes or cuts upon each pear, thereby completing the peeling of the pear in twelve cutting actions. I have found, however, that when the pear is of a larger size that it is advantageous to increase the number of cuts. This I accomplish by the simple procedure of changing the gears 204 and 205 to increase the gear ratio from 2½ to 1 to 3 to 1, thereby causing an increased number of strokes of the cutters from 3 to 4 for each cycle of operation of the cutter head while likewise increasing the speed of rotation of the cam ring 212 for each rotation of the cutter head. At the same time, in order to increase the number of reciprocations of the cutter heads for each peeling cycle, I change the drive from the shaft 137 to the sleeve 142. This is accomplished by removing the gear 141 and driving the gear teeth 143 from the pinion 140 as is illustrated in Figure 2. With the gear 141 removed, I then drive through the gear 140, through an idler 238 to a pinion 239, which pinion 239 is in mesh with the gear teeth 143 of the sleeve 142. This enables me to effect a change in gear ratio equivalent to that of changing from the gear ratio of 2½ to 1 to 3 to 1. The reason for the interposition of an idler in this drive is to avoid a change in direction of drive of the sleeve 142.

After the peeling operation has been completed as heretofore set forth, the pear is transferred from the peeling unit across the splitting blade 10, which severs the flesh of the pear into two halves and into position upon the blade 15 of the coring unit 16 where the pear is aligned on its reference axis now formed by taking the stem core by the stemming tube 9 and tube 14 of the splitting blade 15. Alignment is maintained in the coring unit on the cylindrical guide 241 and upon the tubular section 242 of the journal for the knife shafts to which coring knives 243 and 244 are secured.

The coring unit embodied in the machine of my present invention is similar to that set forth in my copending application, Serial No. 355,988, and is of the same construction, drive and mode of operation as therein set forth with the exception of the addition of the calyx end reference stop 245 which is stationary. As in my copending case, the coring unit is supported from the bracket 176 of the main turret and the drive shaft 246 is driven through the operation of the cam roller 247 (Figure 13) riding within the cam way 248 of the cam ring 249 carried by the cylindrical cover cam 161.

The roller 247 acts to oscillate a gear segment 250 which is in mesh with and drives the pinion 251. The pinion 251 is secured to the shaft 252 which is journaled in the bracket 176 and is coupled by means of a releasable coupling 253 to the shaft 246. The shaft 246 extends through a gear case cover 254. The base of the gear case cover is formed by the base casting 255. The cover 254 and base 255 are secured together by means of stud bolts 256.

Within the gear case thus formed a double pinion 257 is secured to the shaft 246. The double pinion 257 has two pinion sections of different diameter 258 and 259. The coring blades 243 and 244 are supported upon separate shafts 260 and 261 and are separately driven from the pinion 258 by means of vertically spaced drive pinions 262, 263 positioned within the gear case. The two shafts 260 and 261 are housed within a tubular shaft 264 which is journaled on the base plate 255 of the gear casing. The shaft 264 has formed at its upper end a pinion 265 which meshes with the pinion section 259 of the double pinion 258. The tubular shaft 264 carries a trimming knife yoke 266.

The plate 240 is cut out as indicated at 267 to receive the yoke 266, shaft 264 and in this cutout the yoke 266 supports a pair of trimming knives 268 which are formed to follow the contour of the cutout to retrim the calyx end of the pear to reproduce the appearance of the calyx end depression.

Supported within the tubular shaft 264 is a tubular journal 269, the head 270 of which is seated in a depression 271 formed in the pinion 265. At its lower end the journal 269 carries the reference stop 245. The stop 245 may be formed as including a cylindrical disc 272 from the bottom surface of which there is projected a plate 273 which is formed to the contour of the trimming knives 268 and projects downwardly into the calyx end depression of the pear being trimmed forming a stripping blade to prevent accumulation of trimming.

As the two coring knives 243 and 244 are supported upon the separate shafts 260 and 261, they are each offset from the axial center of the blade 240. The parallel shafts 260 and 261 are journaled in the journal 242 and as previously stated, are separately driven by pinions 262 and 263. The shaft 260 is driven through its offset arm 274 which is secured to its drive pinion 262 by means of a stud.

Similarly the shaft 261 which lies immediately to the rear of the shaft 260 as viewed in Figure 20 is driven by its offset arm 275 through the medium of the stud 276 in the pinion 263. The ends of the shafts 260 and 261 are supported and journaled within the cylindrical guide 241.

The coring knives 243 and 244 are generally elliptical in shape and are connected at their opposed ends to their respective supporting shafts 260 and 261.

While I have herein set forth a preferred embodiment of my invention in the method and apparatus for the peeling of fruit such as pears, it will be obvious to those skilled in the art that my invention is susceptible of wide modification and variation without departing from the spirit of my invention as the same is defined in the appended claims.

I claim:

1. In a pear preparation machine of the character described, a feed head including a feed ring into which the stem end of a pear is adapted to be positioned, stop means adapted to be mounted in position to pass into the calyx depression of the pear, means for moving the feed ring to move the pear so that the stop means passes into the calyx end of the pear whereby a reference axis is established longitudinally of the pear, means for gripping the pear from its exterior after the reference axis has been established, and means for moving the feed ring to move the pear under a calyx end cutting means whereby a reference plane is formed at the calyx end of the pear in a direction transverse to the established reference axis.

2. In a fruit preparation machine, a feed head including a feed ring into which a fruit is adapted to be positioned with its stem end down, a centering pin, means for moving the centering pin down into predetermined position, means for moving the centering ring up to move the calyx end of the fruit over the centering pin as determined by the size of the fruit, said latter means including a friction drive permitting the centering of fruit of different sizes between the feed ring and the centering pin, a pair of gripping members adapted to contact the fruit upon its exterior surface after it has been centered, and means for actuating said gripping members, said latter means including compensating means permitting the gripping members to compensate for the irregularities of the fruit as centered between the feed ring and the centering pin, and a lock means adapted to lock the gripping members in compensated fruit-engaging position.

3. In a fruit preparation machine, the combination of a feed means adapted to grip and support a fruit, a tube for impaling and supporting the fruit along a longitudinal axis, means for holding the fruit from one end, means for continually progressing the tube toward the holding means during peeling of the fruit, and means for peeling the fruit in a direction toward the holding means during progression of the tube.

4. In a fruit peeling machine, the combination of a stemming tube upon which a fruit to be peeled is impaled, stop means for holding the fruit from movement, means for progressively feeding the stemming tube toward the stop means through the fruit, and means for peeling the fruit during progression of the stemming tube through the fruit, said peeling being performed in a direction toward the stop means.

5. In a fruit preparation machine, the combination of means for receiving and supporting a fruit with its calyx end up to define a longitudinal reference axis coincident with the stem fibres therethrough, means for cutting through the fruit in a direction transverse to the longitudinal reference axis to form a reference plane at one end of the fruit, means for impaling the fruit along the established reference axis, means for holding the fruit from the reference plane, means for peeling the fruit so held in a direction toward the holding means at the transverse reference plane, means for releasing the holding means, means for gripping the fruit from its exterior to move the same in the direction of its reference axis over a splitting blade whereby the fruit is cut into halves and to center the seed cavity of the fruit with reference to coring knives; means for actuating the coring knives to cut the seed from the fruit, and cutting means operably connected with and actuated in conjunction with the coring knives for reforming the fruit at the reference plane calyx end of the fruit, and after the fruit has been cored.

6. In a pear preparation machine, the combination of a feed turret, a peeling turret, means in the feed turret for receiving the stem end of a pear, means engaging the calyx end of the pear to position the pear in the holder to determine the reference axis through the pear, means for gripping the butt of the pear so positioned, means for releasing the calyx end engaging means, means for cutting the pear at the calyx end to form a reference plane, and means for transferring the pear so positioned from the feed turret to the peeling turret, including means for holding the pear on the reference axis and reference plane.

7. In a pear preparation machine, the combination of a holder in which the stem end of the pear is positioned, a calyx centering means, means for relatively moving the holder and the calyx centering means to position and hold the pear in the holder on a reference axis corresponding substantially with the stem of the pear, means for gripping the butt end of the pear, and means for locking the gripping means.

8. In a pear preparation apparatus, the combination of a feed turret and a second turret, a feed ring in the feed turret, means adapted to cooperate with the feed ring to determine a reference axis through the pear to substantially coincide with the stem of the pear, a stemming tube carried in the second turret, means for moving the feed ring and the stemming tube in timed relation to a position of transfer, means for impaling the pear along the reference axis on the stemming tube, and means for actuating the stemming tube to raise the pear from the feed ring whereby the pear may be transferred into the second turret.

9. In a pear preparation machine, the combination of a feed turret and an operating turret, means in the feed turret to receive a pear, means in the feed turret for positioning the pear in the pear-receiving means upon a longitudinal axis corresponding substantially to the stem of the pear, means for transferring the pear to a position of transfer to the operating turret, means in the operating turret for impaling the pear so held from its opposed ends along the reference axis, and means for actuating the said impaling means to transfer the pear out of the pear receiving means.

10. In a pear preparation machine, the combination of a feed turret including a pear-receiving member, means in the feed turret adapted to cooperate with the feed ring to position the pear on a reference axis corresponding substantially with the stem of the pear, means for cutting one end of the pear in a direction transverse to the reference axis, an operating turret, means for moving the pear so positioned to a position of transfer to the operating turret, means in the operating turret for impaling the pear so positioned along the reference axis from opposed ends of the pear, said impaling members carrying a stop means adapted to engage the cut end of the pear.

11. In a pear preparation machine, the combination of a feed turret, a feed head carried by the turret comprising a feed ring, centering pin and holding clamp, the feed ring being adapted to receive the neck of the pear, means for actuating the feed ring and the centering pin to position the pear, means for actuating the clamp to hold the pear so positioned, the centering pin actuating means being operable to withdraw the centering pin from the pear when the pear is held by the clamp.

12. In a pear preparation machine, the combination of a pear supporting means for supporting a pear on a reference axis, clamping means for engaging the butt of the pear when so supported, said clamping means including a pair of engaging members, holding arms for the engaging members, means for yieldably urging the holding arms together, a wedge lock interposed between said holding arms, including a wedge bar, and means for actuating the wedge bar to locking position when the engaging members are in contact with the bar.

13. In a pear preparation machine, a feed turret including a feed ring, a center, the feed ring being adapted to receive the neck of the pear, means for actuating the center to position the same in the line of the stem axis of the pear, means for actuating the ring to move the pear so held so that the centering means passes into the calyx of the pear.

14. In a pear preparation machine, a feed ring, a centering means, the feed ring being adapted to receive the neck of a pear, means for actuating the centering means, means for actuating the feed ring to move the pear so that the centering means passes into the calyx of the pear, the ring actuating means including a slip drive whereby movement of the ring will stop when the pear is arrested by the centering means contacting the pear calyx.

15. In a pear preparation machine, the combination of a feed ring, a center adapted to pass into the calyx of the pear whereby the axial position of the pear as supported in the ring is determined substantially coextensive with the stem of the pear, means for moving the ring toward the centering means, said latter means including a yielding drive adapted to permit movement of the pear stop when the center is positioned within the calyx of the pear, means for cutting away the stem end of the pear, means actuated in accordance with the length of the pear to determine the distance below the ring at which the pear is cut away in a direction transverse to the said established axis.

16. In a pear preparation machine, a peeling turret, means for revolving the turret, a peeling head, means for reciprocating the head, means for revolving the head, means for changing the operation of the head reciprocating means to increase the number of reciprocations for each peeling cycle of the turret, and means for changing the speed of revolution of the head in accordance with the speed of reciprocation of the head.

17. In a pear preparation machine, the combination of a stemming tube upon which a pear is impaled from one end along a stem axis, an impaling blade impaled into the other end of the pear, a pear end-stop, means for peeling the pear in a direction toward the stop, a splitting blade, means for transferring the pear from the stemming tube over the splitting blade, and means operable to move the stop from the path of the pear prior to the operation of transfer to permit the pear to be passed over a guide tube on the splitting blade and through the position occupied by the stop.

18. In a pear preparation machine, the combination of means for supporting a pear along its stem axis, a peeling assembly including a plurality of peeling knives, a rod for supporting each peeling knife, a peeler head from which the rods extend, means for reciprocating the peeler head in a direction lengthwise of the pear, means for urging the rods to move the peeling knives toward the stem axis support, means operable during peeling for rotating the peeler head through an arc of revolution during each stroke of reciprocation, and means within the peeler head for moving the peeling knives away from the pear on movement of the peeler head in one direction.

19. In a pear preparation machine, a peeling assembly including a head, means for reciprocating the head in the direction of the length of the pear, means for rotating the head through an arc during each stroke of reciprocation of the head, a plurality of peeling knives carried by the head, means within the head operably connected with the head rotating means for actuating the peeling knives to and from peeling position whereby the peeling knives operate on one stroke of the head to follow a spiral cutting path, and are moved out of cutting position on the return stroke.

20. In a method of preparing pears, the steps of positioning a pear to determine the longitudinal axis therethrough containing the stem fibres of the pear, holding the pear in such position, cutting a portion of the calyx end of the pear in a direction transverse to the said reference axis to establish a reference plane, stopping the pear in position at said plane, peeling the pear in a general end to end direction toward said reference plane while it is so stopped, moving the stop away from the reference plane, moving the pear along the reference axis so established to core the pear and to locate the seed pod in position so that a cutter is passed around the seed pod.

GUY A. DUNN.

REFERENCES CITED

The following references are of record in the file of this patent:

UNITED STATES PATENTS

| Number | Name | Date |
|---|---|---|
| 1,467,616 | Forry | Sept. 11, 1923 |
| 1,820,351 | Duncan | Aug. 25, 1931 |
| 1,836,320 | Goranson | Dec. 15, 1931 |
| 1,950,718 | Duncan | Mar. 13, 1934 |
| 2,139,704 | Thompson | Dec. 13, 1938 |
| 2,179,529 | Thompson | Nov. 14, 1939 |
| 2,187,075 | Coons | Jan. 16, 1940 |
| 2,286,648 | Rogers | June 16, 1942 |